Jan. 27, 1970    C. E. TIBBALS    3,491,424
WIRE CUTTING CHISEL DEVICE AND METHOD
Original Filed Oct. 12, 1965    3 Sheets-Sheet 1

INVENTOR
CHARLES E. TIBBALS
BY Browne, Schuyler, & Beveridge
ATTORNEYS.

Jan. 27, 1970     C. E. TIBBALS     3,491,424
WIRE CUTTING CHISEL DEVICE AND METHOD
Original Filed Oct. 12, 1965     3 Sheets-Sheet 2

INVENTOR
CHARLES E. TIBBALS

BY Browne, Schuyler, & Beveridge
ATTORNEYS

Jan. 27, 1970  C. E. TIBBALS  3,491,424
WIRE CUTTING CHISEL DEVICE AND METHOD
Original Filed Oct. 12, 1965  3 Sheets-Sheet 3

INVENTOR
CHARLES E. TIBBALS

BY *Browne, Schuyler, & Beveridge*

ATTORNEYS

United States Patent Office 3,491,424
Patented Jan. 27, 1970

3,491,424
WIRE CUTTING CHISEL DEVICE AND METHOD
Charles E. Tibbals, Box 218, Oneida, Tenn. 37841
Continuation of application Ser. No. 495,283, Oct. 12, 1965. This application Dec. 7, 1967, Ser. No. 688,939
Int. Cl. B23p 19/04; B23d 25/02
U.S. Cl. 29—200                                       11 Claims

ABSTRACT OF THE DISCLOSURE

Improvement on wire cutting where the wire is wedged in a groove in a moving wooden member workpiece. The wire cutting knives or chisel means mounted on a carrier so that on engagement of the cutting knives or chisels, the knives or chisels and carrier are rotated by movement of the wooden member and at the speed thereof whereas during movement of the wire cutting means to engagement with the wooden member said cutting means are moved at a different speed by the drive mechanism for the wooden members. A lost motion connection between the mounting for the knife or chisel carrier permits the differential movement of the knives and a spring means and cooperating stop or abutment members position the knives for a succeeding cutting operation. Other features of the invention are disclosed in the accompanying specification.

---

This application is a streamlined continuation of Ser. No. 495,283, filed Oct. 12, 1965, now abandoned.

The present invention relates in general to improvements in apparatus for severing wire residing in grooves in wooden members, and, more particularly, relates to wire cutting apparatus in wire bound parquet flooring block assembly machines of the continuous type.

Tibbals Patent 2,983,295, issued May 9, 1961, discloses a high speed parquet flooring block assembly machine and method wherein spaced groups of relatively narrow wooden slats are carried by conveyer chains having lugs separating the slat groups about a rotatable assembly drum. Wire strands from a continuous wire supply are guided into grooves in the nonwear surfaces of the slats so as to bind the slats in parquet block assembly with a transverse spacing between adjacent slats, said spacing being formed due to assembly of the slats on the surface of the drum. A pair of transversely spaced chisel or wire cutting means sequentially sever the wire strands within the confines of each terminal slat of a group of slats and simultaneously deforms the ends of the severed wires into the terminal slats of the blocks. Actuatable gripping means subsequently engage and remove the wire remanent intermediate the spaced groups of salts and withdraw the remanents from the grooves and the space between slats in a direction substantially normal to the nonwear surface of the slats. The Tibbals machine shown in Patent 2,983,295 has proved to be highly successful in commercial use and such assembly machines assemble in excess of some 7,000,000 units of parquet block flooring in a year. While the Tibbals machine has proved highly successful, there was occasionally a tendency on the part of the wire cutting chisels or knives to tear out the wood as the cut was being made, and, also, at times, the clinched or anchored ends of the binding wires tended to be pulled out so as to cause them to protrude below the nonwear surface of the blocks. Blocks with damaged end slats or wires protruding below the under-surface of the blocks were generally sorted out as not being commercially acceptable. Even though such defective blocks may be quite low, percentagewise, of the total produced, on such large volumes, it is of significant economical value to reduce the number of unacceptable blocks.

Accordingly, a major objective of this invention is to provide apparatus and methods for reducing the number of defective blocks produced on machines of the Tibbals type and thus increase the efficiency of these machines. A further objective of this invention is to provide improved high speed wire cutting methods and apparatus.

It has been found that the problems alluded to above are due to the fact that the chisel or knife edges for the wire cutters have a pitch diameter which is larger than the drive sprocket connection to the slat-carrying chains whereby the peripheral speed of the chisel points themselves is higher than the speed of their drive sprocket and thus somewhat higher than the peripheral speed of the individual slats on the assembly drum which are moved by the chain. The invention solves this problem by mounting the wire cutting chisels on a chisel carrier, rotatably mounting the chisel carrier on a shaft which is driven in synchronism with the movement of the wooden slats, and positively driving the chisel carrier with the shaft until a wire cutting chisel engages a wire in a groove and then allowing movement of the chisel carrier and chisels relative to said shaft during the cutting of the wire by the wooden member, to cause the chisels to travel at a speed equal to the speed of the wooden members as the wire is cut. As soon as the chisel leaves the wood it is returned to its initial position (advanced relative to its shaft) by a biasing spring so that it is in proper position for cutting the wire the next succeeding time. In other words, the mounting of the chisel carrier permits a back drag of the chisel edges or points while in contact with the wood during the wire cutting operation and, upon the chisel point losing contact with the wood, it is advanced by the spring to a fixed position so as to engage the wood in proper position relative to the block being formed for the next cutting operation. The individual chisel carriers may be adjusted relative to the shaft and relative to each other so as to stagger the point of cut on the wooden slat member and to adjust the position of the cut from the edge of the wooden slat, and, preferably, there are a plurality of chisels carried by the chisel carrier.

The above and other objects and advantages of the invention will become more apparent when considered in light of the following specification and annexed drawings wherein.

It is to be understood that although the present invention is described in connection with parquet flooring block assembly machines, the invention has a wide application and may be utilized in machines for cutting wires or other materials in wooden or other tearable material moving continuously along an arcuate path at a relatively high rate of speed and the problem is to avoid damage to or imperfect formation of the work piece by action of the cutting chisels or knives.

Figure 1:
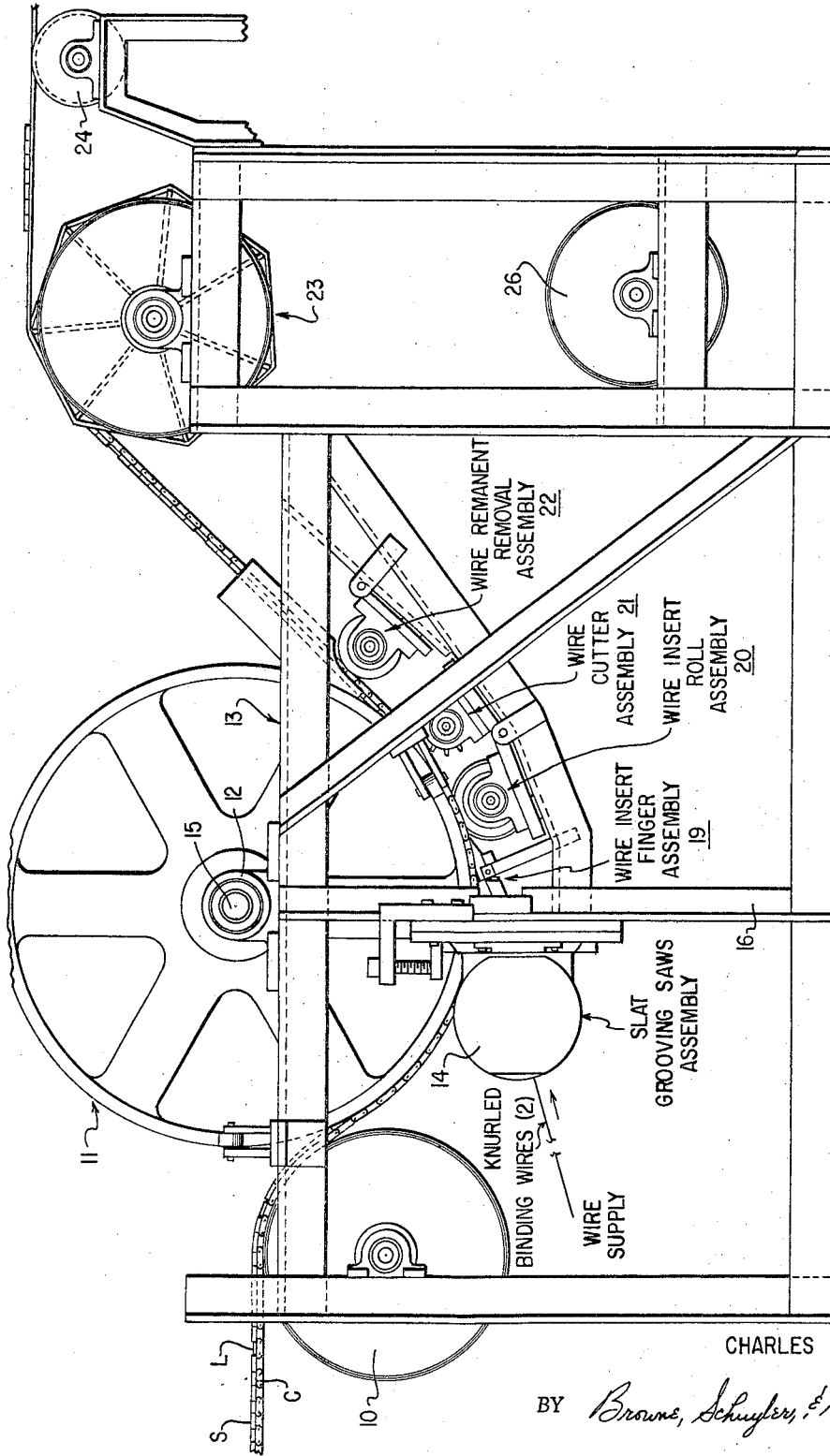
FIG. 1 is a side elevational view of a portion of a parquet block assembly machine to which the invention has been applied.

As shown in FIG. 1 of the drawings, groups of slats S are conveyed from a grouping and compilation and sorting stations (not shown) by lugged conveyer chains C in spaced groups of slats corresponding in number to the number of slats in a parquet flooring block. Conveyer chains C have slat group spacing lugs L and are trained about idler sprockets 10 which guide the slats into contact with rotatable assembly drum 11 having stub shafts 15 journaled for free rotation in arbors 12 fastened on frame 13. Drum ribs R aid in confining the slats and chains about the slat supporting surface of assembly drum 11.

About assembly drum 11 are disposed a plurality of work stations which include saw means 14 for grooving the slats for receiving small gauge (about .051" diameter) binding wires, means for inserting and seating the binding wire into the grooves (assemblies 19 and 20), means for cutting the wire 21, and a remanent removal assembly 22 for removing a portion of wire between succeeding groups of slats. Chains C move the groups of slats through the various work stations in substantially the same manner as described in Tibbals Patent 2,983,295, and the various work stations perform the same functions in substantially the same manner as there described and the disclosure of said Tibbals Patent 2,983,295 is incorporated herein by reference.

While the improvement herein lies in the wire cutter assembly and operation of same, brief reference will here be made to the other work stations. Grooving saws 14 are adjustably mounted on vertical standard 16 of frame 13 to adjust the depth of grooves cut into the nonwear surface of slats S. These saws may likewise be adjusted laterally relative to the frame of the machine by a mechanism not shown to adjust the spacing between the saw cuts. The basic difference between the grooving saws in this application and the grooving saws of Tibbals Patent 2,983,295 is that the grooving saws of the instant application cut the grooves after the slats have been placed on assembly drum 11 rather than prior to being placed on the assembly drum. Wire strands W are fed from a supply (not shown) through a wire insert finger assembly into the grooves or kerfs cut by grooving saw assembly 14. The wire insert finger assembly guides the wire strand W into the groove and, in general, includes a tapered bore (not shown) leading to a grooved tip (not shown) lying flush with the nonwear surface of the slats with the groove in the tip being aligned with the grooves in the slats. Wire insert roll assembly 20 seats the wire which has been positioned in the groove by the wire insert finger assembly in the bottom of the grooves. Since the slats are spaced by the lugs on the chains, there will be a short piece of wire bridging groups of slats as they move along.

Wire cutter assembly 21 (described more fully hereinafter) includes four chisels or wire cutting knives per wire strand W, arranged in sets of two, projecting radially outwardly and aligned with the grooves. Each set of two knives are angularly spaced with respect to one another a distance equal to the distance between the trailing edge of a leading group of slats and the leading edge of a following group of slats plus a selected distance from the edges of each slat sufficient to leave room for trimming, cutting grooves, etc., for tongue and groove connections in the blocks.

Wire remanent removal assembly 22 includes pairs of cam actuated gripper units (not shown) which reach between the lug space between assembled blocks to remove the wire remanent bridging the space between adjacent groups of slats. Operational details of a wire remanent removal assembly suitable to perform this function is found in Tibbals Patent 2,983,295.

Subsequently, chains C carry the assembled rough block units to a removal device 23 which removes the slats from the conveyer chain C to a removal conveyer 24. The lugged conveyer chain C moves along an endless path to transport more groups of slats S through the assembly machine substantially as described in Tibbals Patent 3,118,804.

THE IMPROVEMENT

Figure 3:
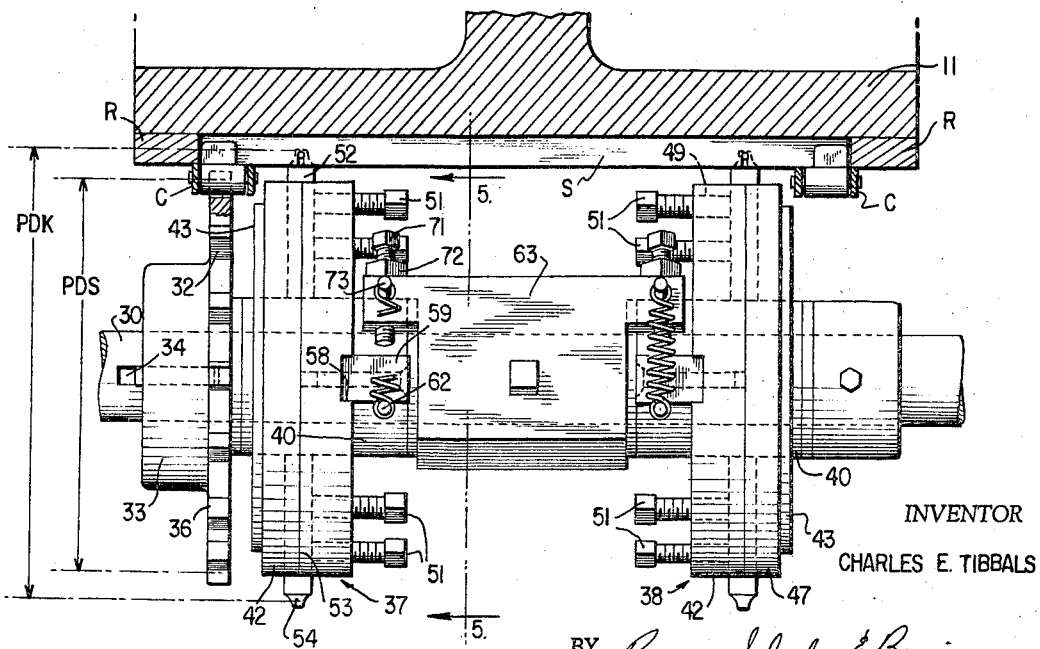
FIG. 3 is a partial sectional view of the chisel or knife carrier as the wire strands are being cut.
Figure 4:
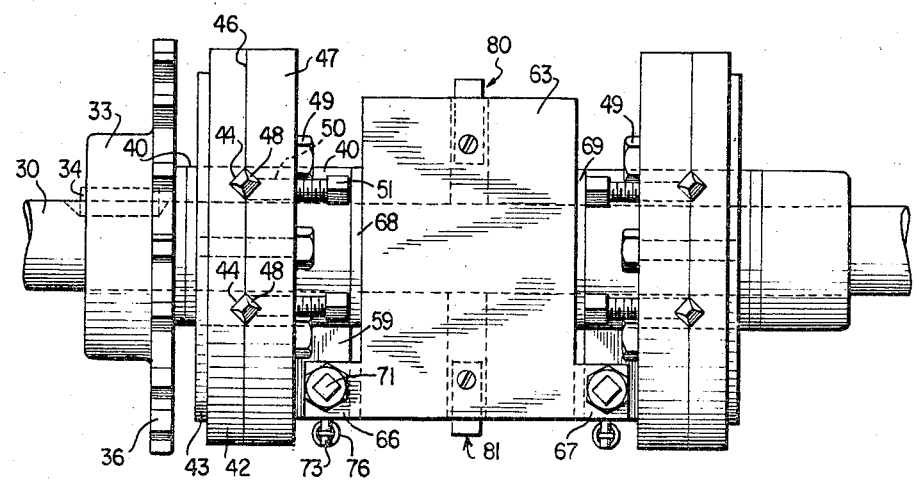
FIG. 4 is a top plan view of the chisel or knife carriers, sprocket and shaft assembly.
Figure 5:
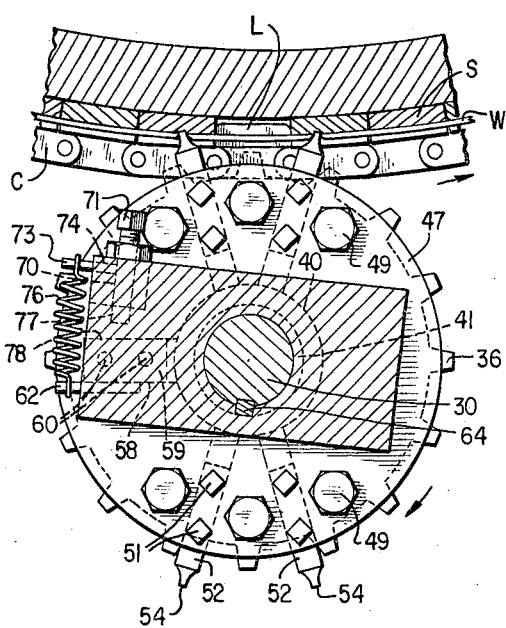
FIG. 5 is a cross-sectional view taken on lines 5—5 of FIG. 3.

The improvement with which the present invention is concerned is best shown in FIGS. 3, 4 and 5. With reference now to these figures, shaft 30 is journaled for rotation in arbors 31 at each side of the machine. Sprocket 32 has sprocket hub 33 splined to shaft 30 by spline member 34. Teeth 36 of sprocket 32 are meshed with conveyer chain C so that as slats S are moved by conveyer chain C about assembly drum 11 shaft 30 is driven in synchronism therewith. A pair of chisel carrier assemblies 37 and 38 are mounted for limited rotation on shaft 30. Chisel carrier assemblies 37 and 38 are identical in construction and only one will be described here.

Figure 6:
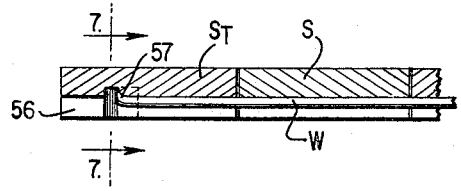
FIG. 6 is a cross-sectional view of an end portion of a parquet flooring block made by the apparatus of the present invention.
Figure 7:
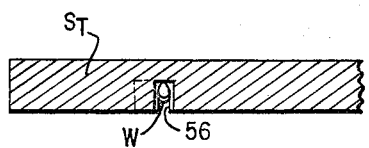
FIG. 7 is an end view taken on lines 7—7 of FIG. 6.

Hub 40 having an internal bushing 41 (FIG. 5) has secured thereto, as by welding or otherwise, knife plate 42 having stepped shoulder 43 on the outside surface thereof and four radially extending, angularly spaced V-shaped grooves 44 on the inner side 46 thereof. A second knife plate 47 having corresponding radially extending, angularly spaced V-shaped grooves 48 is rigidly secured to knife plate 32 by a series of circumferentially spaced cap screws 49. V-grooves 44 and 48 cooperate to form knife-receiving recesses. Bore holes 50 in knife plate 47 are threaded to receive knife set screws 51. Knives 52 have a shank portion 53 shaped to fit the knife recesses formed by V-grooves 44 and 48 in knife plates 42 and 47, respectively, and are secured in the knife recesses by knife set screws 51. As shown in the drawings, the cutting edges or points 54 of wire cutting knives 52 are at an angle of approximately 45° to the transverse axis of shaft 30 and accordingly are at an angle of about 45° to the wire W in the groove 56 in the nonwear surfaces of slats S. However, the cutting edges or points 54 of cutting knives 52 may be parallel to the transverse axles of shaft 30 and thus cut the wire W at 90°. Cutting edges or points 54 of knives 52 may be sharp or somewhat dull. In the disclosed embodiment, and as is preferred, cutting edges or points 54 are adapted to clinch the cut ends of the wire into the terminal slat of the group of slats forming the block as is shown at 57 (FIG. 6) to provide better securement of the terminal slat in assembly, as is described in Tibbals Patent 3,128,-511. The wire W may be smooth or knurled, as also shown in Tibbals Patent 3,128,511.

The knife carriers 37 and 38, with their hubs 40 are mounted for a limited degree of rotation on shaft 30. A rectangular slot 58 in the outside surface of knife plate 47 receives an abutment block member 59 which is secured in slot 58 by countersunk screws 60. Welded to abutment block member 59 is outwardly projecting spring pin 62. Cooperating abutment or stop block member 63 is keyed to shaft 30 by a splining pin 64, or by other appropriate securement means. Washers 68 and 69 are interposed between abutment block members 63 and hubs 40 of carrier members 37 and 38, respectively. The laterally projecting abutments 66 and 67, which project from stop block member 63, have threaded bores 70 receiving abutment adjustment screws 71 and lock nut 72 prevents inadvertent turning of abutment adjustment screw 71 due to vibration, etc. Spring pin 73 has a threaded end which is received in a tapped bore hole 74 in abutment 66 and spring pins 62 and 73 are in alignment with one another.

Tension spring 76 is hooked at its ends on spring pins 62 and 73, respectively. There may be an annular groove in spring pins 62 and 73 to receive the hooked portions of spring 76. Spring 76 thus tends to draw the two laterally projecting abutments toward one another and, when they are in the non-wire cutting position, the end 77 of adjustment screw 71 is in contact with surface 78 of carrier abutment 59 so that as the shaft 30 is rotated by sprocket 36 from lugged conveyer chain C, knife carriers 37 and 38 are rotated in synchronism therewith.

A slip-clutch mechanism between shaft 30 and carriers 62 and 73 may replace the disclosed drive connection.

Figure 2:
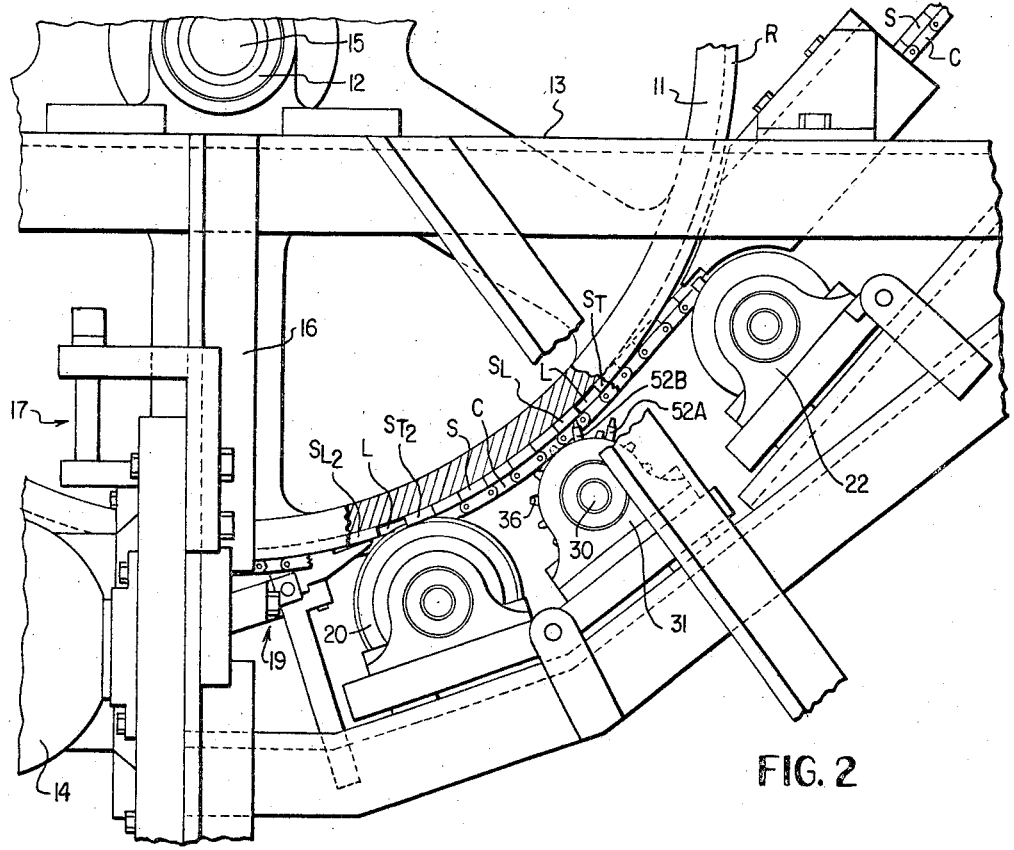
FIG. 2 is an enlarged view of a portion of FIG. 1 showing in greater detail the wire insert devices and chisel assembly.

As shown in FIG. 2, knife 52A is shown after it has left terminal slat ST of a group of slats and knife 52B is shown leaving the leading SL slat of a next succeeding group of slats. At this time, spring 76 is tensioned at its utmost, that is, abutments 66 and 59 are furtherest apart angularly. (It should be pointed out that the distance between the lower end 77 of abutment adjustment screw 71 from surface 78 of abutment 59 is somewhat exaggerated to better show the operation and principles of the invention. In general, this distance is not as large as illustrated.) As soon as knife 52B leaves slat SL (FIG. 2) tension spring 76 advances the chisel carriers 37 angularly with respect to shaft 30 to an angular amount corresponding to the amount lagged by the knives during the cutting operation.

As the first cutting knife of a pair engages the trailing edge of a slat, its rotary movement is then controlled by the wooden slats S rather than by the drive connection of sprocket 33.

Since the pitch diameter PDK of the wire cutting knives 52 is larger than the pitch diameter PDS of sprocket 32, the knife edges or chisel points 54 would have a higher angular velocity than the sprocket teeth being driven by the chain C and hence a slightly larger velocity than the wood slats being carried by the chains and moved by the chain lugs L. The lost motion connection between the sprocket 32 and knife carrier 37 and the knives carried thereby permit the wood slats to drive the knives at their own rate of speed so that there is no binding of the cutting edges or points 54 which tend to tear the wood or dislodge the clinched wire end 57 during the time the knife and the wooden slats are transversing substantially the same path during the cutting of the wires. After the second of the set of knives cuts the wire in the leading slat SL of the next succeeding group of slats and the knife is just leaving the slat SL (FIG. 2), the carrier is advanced by the spring an angular distance corresponding to the difference in angular speed of wire cutting knives 52 when in engagement with the wooden slat members and the speed of the knife immediately prior to its being driven by the wooden members times the length of time the knives are driven by the wooden member. This effectively positions the knives on the knife carrier relative to shaft 30 so that the second set of knives (disposed substantially diametrically oppositely therefrom) cut the wires in the trailing slat $ST_2$ of the group of slats and the leading slat $SL_2$ of the next succeeding group of slats. The exact position of advancement of the knife carriers 37 and 38 relative to shaft 30 is established by set screw 71.

The knife carriers 37 and 38 may be slightly staggered angularly or offset in the knife carriers so as to avoid two cuts in a single slat which are along the longitudinal graining of the wood.

Die holders 80 and 81 in member 63 are disposed at approximately 90° from the knives so that a die carried thereby impresses a supervisor's mark intermediate the edges of the block or other indicia such as a trademark and the like.

It will be appreciated that where a single knife is used instead of a set of knives, and only one knife is engaged with the wood at any given instant, the adverse effects mentioned earlier herein may be less pronounced but that the invention is not limited in this respect.

SUMMARY

Summarizing, the invention solves the problem of severing or cutting wires wedged in grooves in wooden members being moved continuously and uninterruptedly along an (arcuate) path without adversely damaging the wooden member and/or causing the wire from being dislodged from its frictional or wedging engagement with the grooves. In accordance with the invention, the wire cutting knife or chisel is rotatably mounted on a shaft driven in synchronism with the movement of the wooden members until the knife engages the wooden member and then permits movement of the knife by the wooden member during the time period or interval that the wire is being cut and thereafter advances the knife or chisel relative to the shaft into proper position for cutting the wire a next succeeding time.

While a preferred embodiment has been shown in the drawings and described above in detail, it will be understood that numerous modifications may be resorted to without departing from the scope of the invention.

What is claimed is:

1. In a machine for inserting binding wires in aligned grooves of wooden slat members and severing the wires after insertion thereof into said grooves while the wooden members are in motion, the improvement which comprises,
   a rotary shaft,
   means for driving the shaft in synchronism with movement of said wooden slat members,
   a chisel carrier,
   wire cutting chisel means carried by said carrier and projecting radially outwardly therefrom for cutting wire frictionally retained in the grooves,
   means mounting said chisel carrier on said shaft for synchronous drive therewith until said wire cutting chisel engages a wire in a groove and allowing movement of said chisel carrier relative to said shaft during cutting of said wire by said chisel means to allow said chisel means to travel at a speed determined by said wooden members as the wire is cut.

2. In a machine as defined in claim 1 further including spring means to bias said chisel carrier for rotation in a direction to move the carrier a distance equal to the angle lagged by said carrier during wire severance.

3. In a machine as defined in claim 2 including opposed abutment means between said shaft and said carrier and means on one of said abutment means to angularly adjust the positional relationship of said carrier relative to said shaft.

4. The invention defined in claim 1 wherein said machine is a parquet flooring block assembly machine for continuously forming successive groups of grooved slats into discrete parquet flooring blocks, wherein the slats are carried by spaced conveyer chains having lugs separating the slat groups and the slat groups and the chains being trained about a rotatable cylindrical supporting surface, including means for guiding a continuous wire strand into the slat grooves,
   said means for driving said shaft in synchronism with the movement of said wooden slat members comprising a toothed sprocket engaged in said conveyer chain,
   said means mounting said wire cutting chisel means on said shaft for synchronous drive therewith includes means between said shaft and said chisel carrier forming a lost motion connection between the shaft and the carrier.

5. The invention defined in claim 4 further including means for rotating said carrier relative to said shaft after the cutting means has cut the wire in a slat to its initial position prior to said cutter engaging the wire,
   whereby said cutter is moved at the speed of said wooden slat when in contact with the wood and during the cutting of the wire to thereby avoid tearing out of the wood and/or dislodging of the ends of the binding wires as the cutting chisel means leaves the wood.

6. The invention defined in claim 5 wherein said wire cutting chisel means comprises at least two wire cutting chisels angularly spaced with respect to each other a distance equal to the distance between groups of slats plus twice a predetermined distance from the longitudinal edge of a terminal slat, and wherein said means for rotating said carrier relative to said shaft after the cutting means has cut the wire comprises a spring urging a pair of opposed abutments toward each other.

7. The invention defined in claim 6 wherein at least one abutment of said pair of opposed abutments is adjustable and said abutments assure exact positional relationship of the chisel carrier relative to the trailing slat of a block and the leading slat of a next succeeding block.

8. In a method of cutting a small gauge flexible metal wire wedged in a groove in a wooden member without tearing the wooden member and/or dislodging the wire from the groove wherein the wooden member and wire are continuously moving along a first arcuate path and a wire cutting knife means is moved along a second arcuate path in substantially overlapping tangential relation to said first arcuate path, the improvement comprising the step of moving the cutting knife by said wooden member and at the speed thereof during the time said knife and said wooden member are traversing the overlapping tangential portions of their respective arcuate paths.

9. The method defined in claim 8 wherein the wire is cut at a plurality of successive points in a plurality of different wooden members, respectively, and after each cut of the wire by said knife means said knife means is advanced an angular distance corresponding to the difference in angular speed of the knife means when in engagement with the wooden member and the speed of the knife means immediately prior to its being driven by said wooden member times the length of time said knife means is driven by said wooden member whereby lengths of wire cut by said knife means are equal.

10. The method defined in claim 8 wherein said wooden members are spaced groups of thin, relatively narrow wooden slats and the wire is cut in the leading slat of a group of slats and the trailing slat of a preceding group of slats during the time said knife means is moved by said wooden member, the trailing slat first moving said knife means, then both said leading and trailing slats moving said knife means and then the said leading slat moving said knife means, and then advancing said knife means an angular distance corresponding to the difference in angular speed of the knife means when in engagement with the wooden members and the speed of the knife means immediately prior to its being moved by the wooden member times the length of time the knife means is moved by the wooden members.

11. In a method of cutting a small gauge flexible metal wire wedged in a groove in a wooden member without tearing the wooden member and/or dislodging the wire from the groove wherein the wooden member and wire are continuously moving along a first path and a wire cutting knife means is moved along a first path and a substantially overlapping parallel relation to said first path, the improvement comprising the step of moving the cutting knife by said wooden member and at the speed thereof during the time said knife and said wooden member are traversing the overlapping parallel portions of their respective paths.

References Cited

UNITED STATES PATENTS

| | | |
|---|---|---|
| 2,650,627 | 9/1953 | Tibbals. |
| 2,820,282 | 1/1958 | Schneider. |
| 2,983,295 | 5/1961 | Tibbals _____ 144—318 |

THOMAS H. EAGER, Primary Examiner

U.S. Cl. X.R.

29—208, 427; 83—37, 308, 909; 144—3, 318